Aug. 5, 1969   J. D. WALSH   3,459,446

PIPE COUPLING HAVING MANUAL QUICK JOINING RING MEANS

Filed May 23, 1967

INVENTOR
JAMES D. WALSH

BY Seidel & Gonda

ATTORNEYS.

United States Patent Office 3,459,446
Patented Aug. 5, 1969

3,459,446
PIPE COUPLING HAVING MANUAL QUICK
JOINING RING MEANS
James D. Walsh, New Britain, Conn.
(756 Weybridge Drive, Bloomfield Hills, Mich. 48013)
Filed May 23, 1967, Ser. No. 640,728
Int. Cl. F16l 37/00, 43/00
U.S. Cl. 285—362            1 Claim

ABSTRACT OF THE DISCLOSURE

A quick connect coupling is provided wherein conduits such as a sink trap may be manually coupled to another conduit rapidly without necessitating the use of tools. A first conduit is telescopically received in a second conduit and is coupled thereto by means of a rotatable ring. The ring has sloping cam surfaces on its inner surface for cooperation with outwardly extending projections on the second conduit. The cam surfaces have a plurality of notches for receiving ridges on the projections. A sealing ring is received between the first and second conduits and is engaged by a flange on the rotatable ring.

---

The present invention relates to quick connect couplings, and more particularly, to such couplings which can be manually coupled and uncoupled without utilizing or requiring tools. The installation of conduits, such as plumbing traps, is time consuming and tiresome due to the position which the worker must assume when installing the same. A trap constructed in accordance with the present invention will enable the same to be installed in a matter of minutes. In addition, the trap can be installed in confined areas which do not permit the tools utilized heretofore for tightening the joint.

In accordance with the present invention, a first conduit is coupled to a second conduit by means of a ring which surrounds an end portion of the first conduit and has a radially inwardly directed flange overlying at least a part of the end face of the end portion. The ring has a sloping cam surface on its inner surface for cooperating with a projection on the first conduit end portion. One of the cam surface and projection have a ridge and the other has a notch for receiving the ridge. The cooperation between the ridge and notch retains the ring in a predetermined rotative position with respect to the first conduit. A deformable packing forms a seal between the conduits as a result of rotation of the ring.

It is an object of the present invention to provide a manual quick connect coupling.

It is another object of the present invention to provide a plumbing trap which can be installed manually without the use of tools and more rapidly than those utilized heretofore.

It is another object of the present invention to provide a manual quick connect coupling having variable degrees of tightening.

Other objects will appear hereinafter.

For the purpose of illustrating the invention, there is shown in the drawings a form which is presently preferred; it being understood, however, that this invention is not limited to the precise arrangements and instrumentalities shown.

Figure 1:
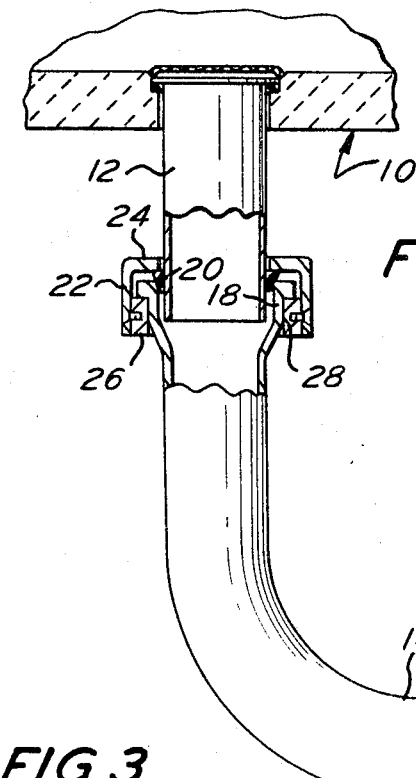
FIGURE 1 is a side elevation view of one form of the present invention, with portions shown in section for purposes of clarity.

Referring to the drawing in detail, wherein like numerals indicate like elements, there is shown in FIGURE 1 a portion of a sink or other plumbing fixture designated generally as 10. The plumbing fixture 10 has an outlet drain pipe 12 connected to another conduit such as a plumbing trap 14. Trap 14 is connected to a sewer pipe or other receiver for liquids by way of conduit 16.

Trap 14 and pipe 12 are connected together by a manual quick connect coupling in accordance with the present invention. As shown more clearly in FIGURES 1 and 2, the upper end portion of trap 14 is provided with an enlarged diameter terminal end portion 18. A deformable packing 20 made from rubber, plastic, etc. provides sealing contact between the outer periphery of pipe 12 and end portion 18. A ring 22 surrounds the end portion of trap 14 and the lower end portion of pipe 12. Pipe 12 extends through a hole in the ring 22 defined by the radially inwardly extending flange 24 on ring 22.

The ring 22 has cams 26 and 28 on its inner peripheral surface. The cams 26 and 28 may be integral with ring 22 or connected thereto by screws, welding, etc. The cams 26 and 28 are spaced from one another and diametrically opposite one another so as to define gaps 30 between their adjacent ends. The arcuate length of the cams is approximately 160°. However, the length of the cams may be varied as desired.

The cams 26 and 28 are identical. Hence, only cam 28 will be described in detail. As shown more clearly in FIGURE 2, the cam 28 has an inclined cam surface 32 interrupted at spaced points by notches 34. At the upper end of the inclined cam surface 32, there is provided a limit stop 36.

The upper end portion 18 of trap 14 is provided with radially outwardly extending projections 38 and 40 at diametrically opposite points. On each of the projections 38 and 40, there is provided at least one ridge 42 on the lower surface. Ridge 42 is adapted to be received in the notches 34. It is within the scope of the present invention to reverse the position of the notches and ridges. That is, ridges can be provided on the cam surface 32 and a notch on the projections 38 and 40 for cooperation with the ridges.

To effect the coupling between pipe 12 and trap 14, no tools are required. The ring 22 is telescoped over the pipe 12. The deformable packing 20 is then positioned so as to surround the pipe 12 below the plane of the flange 24. Trap 14 is then positioned so that the ears 38 and 40 enter the gaps 30 and at least a portion of the end face of the upper end portion of trap 14 engages the packing 20. At this point, the end portions 38 and 40 will be slightly above the lowest end of the inclined cam surface 32. Thereafter, the ring 22 is rotated manually until the ridge 42 is received in one of the notches 34. Continued rotation of the ring 22 will tighten the coupling and effect a watertight seal between the trap 14 and conduit 12. It is to be noted that rotation of the ring 22 to effect a seal is less than 160°. Generally a watertight seal is effected by rotation of the ring 22 less than 90°. The cooperation between the ridges 42 and the notches 34 retains the ring 22 in any rotative disposition and prevents the projections 38 and 40 from sliding back down the inclined cam surfaces.

As the ring 22 is rotated to cause the projections 38 and 40 to ride up the inclined cam surfaces on the cams 26 and 28, the flange 24 cooperates with the upper end portion of trap 14 to deform the packing 20 to effect a seal. Packing 20 is preferably wedge-shaped in cross section but may assume other configurations. No tools were required to effect the coupling. The entire coupling as described above can be accomplished in less than a minute.

Figure 5:
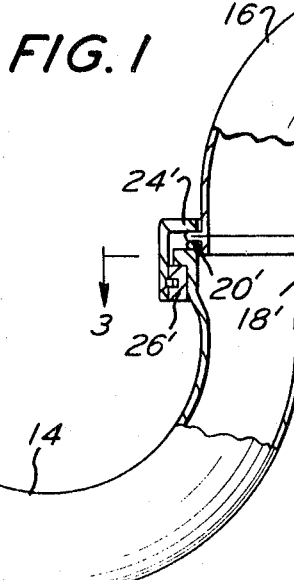
FIGURE 5 is a partial sectional view showing a detail of an alternative form of the present invention.
Figure 5:
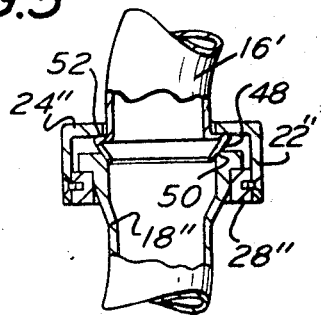
Figure 3:
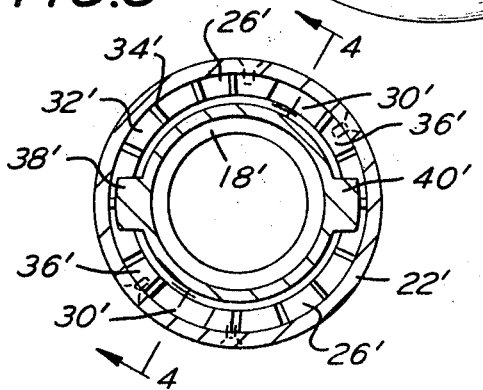
FIGURE 3 is a sectional view taken along the line 3—3 in FIGURE 1.

The coupling between trap 14 and conduit 16 is identical as set forth above except as will be explained hereinafter. Hence, corresponding elements are provided with corresponding primed numerals. The end of conduit 16 to be coupled to trap 14 has a radically outwardly extending flange 46 adjacent its lower end. Flange 24' on ring 22' overlies the flange 46. The packing 20' is positioned below the flange 46. The coupling between trap 14 and conduit 16 is otherwise identical as described above.

Where plumbing codes bar the use of a packing 20' in the coupling between the trap 14 and conduit 16, the conduit 16 may be provided with a taper 48, shown in FIGURE 5, rather than the flange 46. The end portion 18" is provided with a mating taper 50, to thereby form a "ground joint" with the taper 48. The flange 24" on ring 22" overlies an edge portion 52 of the taper 48.

Figure 2:
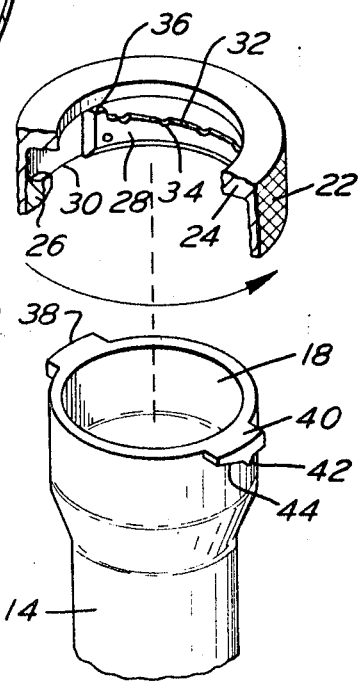
FIGURE 2 is an exploded view of the ring and an end portion of a conduit in accordance with the present invention.
Figure 4:
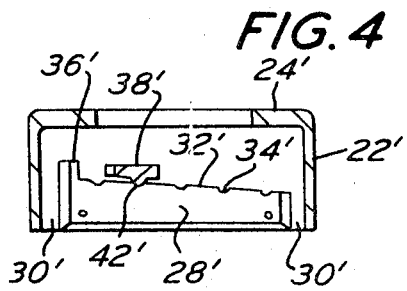
FIGURE 4 is a sectional view taken along the line 4—4 in FIGURE 3.

As shown more clearly in FIGURES 2 and 4, the leading edge of the projections 38 and 40 is believed at 44 so as to prevent binding contact between the projection and the cams as the projections ride up the inclined cam surfaces.

The present invention may be embodied in other specific forms without departing from the spirit or essential attributes thereof and, accordingly, reference should be made to the appended claim, rather than to the foregoing specification as indicating the scope of the invention.

I claim:

1. A manual quick connect coupling comprising a first conduit and a second conduit to be coupled together, said first conduit having two outwardly directed projections formed therewith, said projections having downwardly extending ridges formed therewith, a discrete coupling ring including a flange having a central opening, the central opening in said ring being generally slightly larger than the outside diameter of said second conduit, said first conduit having a slightly larger inside diameter than the outside diameter of said second conduit, said second conduit being telescopically received in said first conduit, a sealing ring adapted to be received between the inside diameter of said first conduit and the outside diameter of said second conduit, said flange on said coupling ring being adapted to apply pressure to said sealing ring to deform the same and provide a water-tight seal between said conduits, two discrete cams secured to the inner periphery of said coupling ring, said cams having sloping cam surfaces interrupted at spaced points by notches, the arcuate length of each of said cams being approximately 160°, a limit stop adjacent the upper end of each of the sloping cam surfaces for limiting the extent of rotation of the coupling ring with respect to said first conduit, the lowest end of said sloping cam surfaces being at generally opposite points on the inner peripheral surface of said coupling ring, only said cams underlying said projections and ridges on said first conduit, said ridges on said projections cooperating with the notches in said cams to permit said conduit to be coupled together by rotation of said coupling ring.

References Cited

UNITED STATES PATENTS

| 242,564 | 6/1881 | Sholder | 285—360 X |
| 1,193,446 | 8/1916 | Wells | 285—361 X |
| 1,533,886 | 4/1925 | Mueller et al. | 285—154 |
| 1,845,882 | 2/1932 | Litchge | 285—361 |
| 2,119,331 | 5/1938 | Jensen | 285—361 X |
| 2,883,083 | 4/1959 | Terry et al. | 285—361 X |

FOREIGN PATENTS

| 5,434 | 1887 | Great Britain. |
| 4,351 | 1904 | Great Britain. |

THOMAS F. CALLAGHAN, Primary Examiner

U.S. Cl. X.R.

285—157